US007825920B1

(12) United States Patent
Chen et al.

(10) Patent No.: US 7,825,920 B1
(45) Date of Patent: Nov. 2, 2010

(54) LEVEL REGULATION CIRCUIT OF COMMON SIGNAL OF LCD

(75) Inventors: Ping-Hsien Chen, Pingtung County (TW); Bi-Hsien Chen, Taipei County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 0 days.

(21) Appl. No.: 12/536,468

(22) Filed: Aug. 5, 2009

(30) Foreign Application Priority Data

Apr. 17, 2009 (TW) .............................. 98112817 A

(51) Int. Cl.
*G06F 3/038* (2006.01)
*G09G 5/00* (2006.01)

(52) U.S. Cl. ......................................... 345/212; 345/87

(58) Field of Classification Search ......... 345/208–213, 345/204, 87
See application file for complete search history.

(56) References Cited

U.S. PATENT DOCUMENTS 5,566,064 A * 10/1996 Schoenwald et al. ........ 363/132
5,874,828 A * 2/1999 Lee ............................ 323/274
2003/0197425 A1* 10/2003 Montante ..................... 307/26
2008/0106538 A1* 5/2008 Ko et al. ..................... 345/211
2008/0218149 A1* 9/2008 Aoki et al. .................. 323/351

* cited by examiner

*Primary Examiner*—Ricardo L Osorio
(74) *Attorney, Agent, or Firm*—Winston Hsu; Scott Margo; Min-Lee Teng

(57) ABSTRACT

A level regulation circuit of a common signal of an LCD generates a first level voltage and a second level voltage according to a common voltage so as to generate a first common signal and a second common signal. Each pixel of the LCD includes two storage capacitors receiving the first common signal and the second common signal respectively. The level regulation circuit of the common signal uses an operational amplifier and one or two Zener diodes to generate the first level voltage and the second level voltage. The first level voltage and the second level voltage have the same voltage difference to the common voltage, so the flicker of the LCD can be reduced.

10 Claims, 9 Drawing Sheets

LEVEL REGULATION CIRCUIT OF COMMON SIGNAL OF LCD

BACKGROUND OF THE INVENTION

1. Field of the Invention

The present invention relates to a level regulation circuit of a common signal, and more particularly, to a level regulation circuit of common signals of a Liquid Crystal Display (LCD).

2. Description of the Prior Art

Please refer to FIG. 1. FIG. 1 is a diagram illustrating a pixel of a conventional Thin Film Transistor (TFT) LCD. Each pixel of the LCD includes a first sub-pixel and a second sub-pixel. The first sub-pixel includes a TFT 16*a*, a liquid capacitor C1cO, and a storage capacitor CcsO. The second sub-pixel includes a TFT 16*b*, a liquid capacitor C1cE, and a storage capacitor CcsE. The TFT 16*a* of the first sub-pixel and the TFT 16*b* of the second sub-pixel are electrically connected to the same data line 14(*m*) and the same scan line 12(*n*). The storage capacitor CcsO of the first sub-pixel is electrically connected to a first common signal line 240. The storage capacitor CcsE of the second sub-pixel is electrically connected to a second common signal line 24E. Thus, the voltage drops across the storage capacitors CcsO and CcsE can be different.

Please refer to FIG. 2. FIG. 2 is a waveform diagram illustrating voltage level of control signals of the pixel shown in FIG. 1. Vs(m) represents the voltage signal of the data line 14(*m*). Vcom represents the common voltage. Vg(n) represents the voltage signal of the scan line 12(*n*). VgH represents the high-level voltage of Vg(n), and VgL represents the low-level voltage of Vg(n). VcsO represents the voltage signal of the first common signal line 240. VcsE represents the voltage signal of the second common signal line 24E. VcsH represents the high-level voltage of VcsO and VcsE. VcsL represents the low-level voltage of VcsO and VcsE. V1cO represents the voltage signal of the liquid capacitor C1cO of the first sub-pixel. V1cE represents the voltage signal of the liquid capacitor C1cE of the second sub-pixel. V1c(c) represents the central voltage of the liquid capacitor. The voltage signal VcsO of the first common signal line 240 is complementary to the voltage signal VcsE of the first common signal line 24E. The voltage level of common voltage Vcom is in the middle of the high-level voltage VcsH and the low-level voltage VcsL and serves as the bias voltage of the voltage signals VcsO and VcsE. The voltage signals VcsO and VcsE are square waves.

Since the common voltages Vcom of display panels of LCDs are different, the common voltage Vcom is required to be adjusted for reducing the flicker of the LCD. However, in the above-mentioned LCD, wherein each pixel includes two sub-pixels, the high-level voltage VcsH and the low-level voltage VcsL of the voltage signals VcsO and VcsE can not be adjusted when adjusting the common voltage Vcom. In this way, the flicker of the LCD can not be effectively reduced.

SUMMARY OF THE INVENTION

An objective of the present invention is to provide a level regulation circuit of a common signal of a Liquid Crystal Display (LCD).

The present invention provides a level regulation circuit of a common signal of an LCD. The level regulation circuit comprises an operational amplifier, a first resistor, a second resistor, a third resistor, a fourth resistor, and a Zener diode. The operational amplifier comprises a positive input end, a negative input end, and an output end. The first resistor comprises a first end and a second end. The first end of the first resistor is electrically connected to the negative input end of the operational amplifier. The second end of the first resistor is electrically connected to a ground end. The second resistor comprises a first end and a second end. The first end of the second resistor is electrically connected to the positive input end of the operational amplifier. The second end of the second resistor is utilized for receiving a common voltage. The third resistor comprises a first end and a second end. The first end of the third resistor is electrically connected to the positive input end of the operational amplifier. The second end of the third resistor is utilized for receiving a reference voltage. The fourth resistor comprises a first end and a second end. The first end of the fourth resistor is electrically connected to the negative input end of the operational amplifier. The second end of the fourth resistor is electrically connected to the output end of the operational amplifier. The Zener diode comprises a first end and a second end. The first end of the Zener diode is electrically connected to the output end of the operational amplifier and is utilized for outputting a first level voltage of the common signal. The second end of the Zener diode is electrically connected to the ground end through an output resistor and is utilized for outputting a second level voltage of the common signal.

The present invention further provides a level regulation circuit of a common signal of an LCD. The level regulation circuit comprises an operational amplifier, a resistor, a first Zener diode, and a second Zener diode. The operational amplifier comprises a positive input end, a negative input end, and an output end. The output end of the operational amplifier is electrically connected to the negative input end of the operational amplifier. The resistor comprises a first end and a second end. The first end of the resistor is electrically connected to the positive input end of the operational amplifier. The second end of the resistor is utilized for receiving a reference voltage. The first Zener diode comprises a first end and a second end. The first end of the first Zener diode is electrically connected to the positive input end of the operational amplifier. The second of the first Zener diode is utilized for receiving a common voltage. The second Zener diode comprises a first end and a second end. The first end of the second Zener diode is electrically connected to the output end of the operational amplifier and is utilized for outputting a first level voltage of the common signal. The second end of the second Zener diode is electrically connected to a ground end and is utilized for outputting a second level voltage of the common signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " Also, the term "electrically connect" is intended to mean either an indirect or direct electrical connection. Accordingly, if one device is coupled to another device, that connection may be through a direct electrical connection, or through an indirect electrical connection via other devices and connections.

Figure 1:
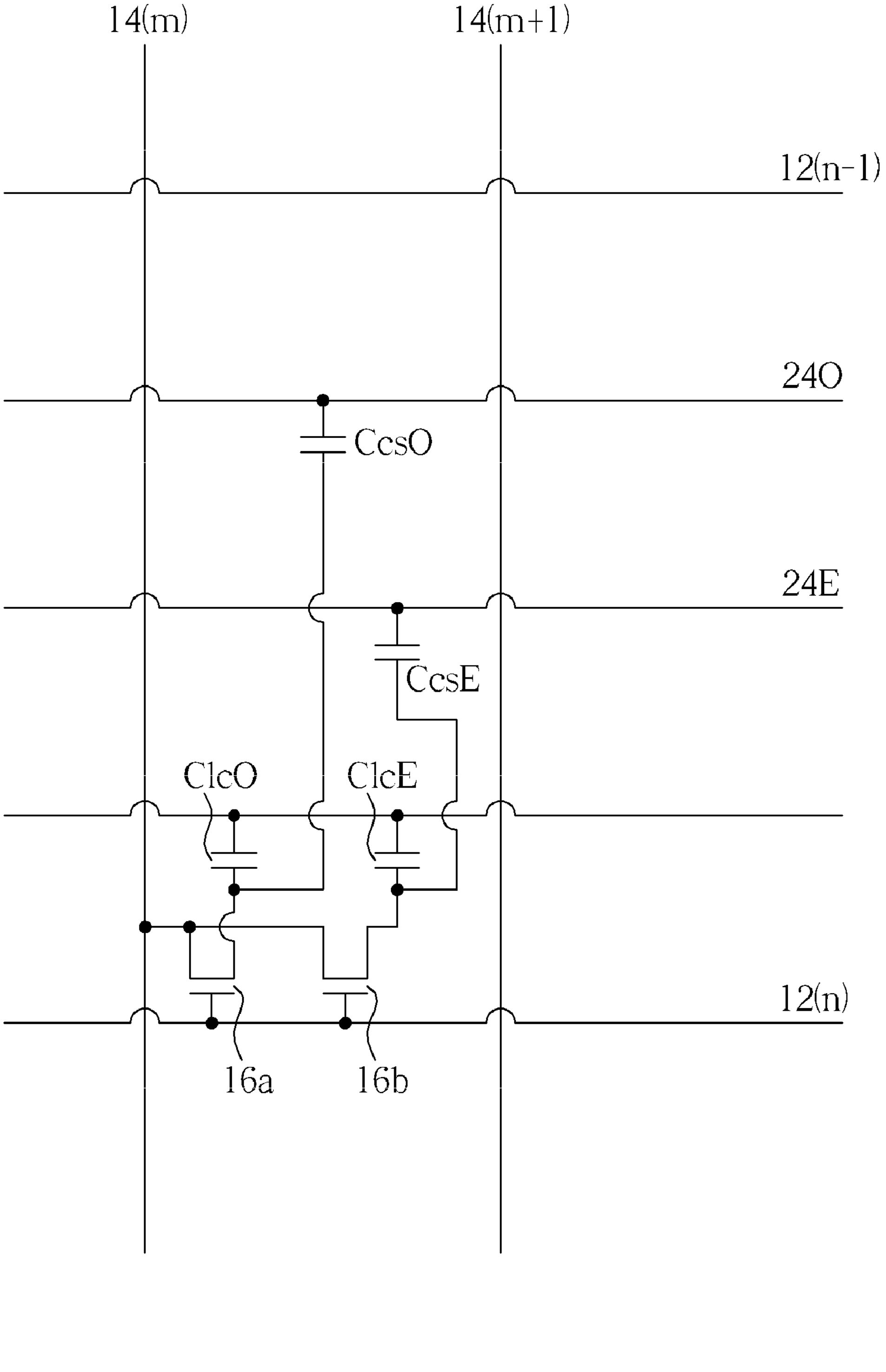
FIG. 1 PRIOR ART
FIG. 1 is a diagram illustrating a pixel of a conventional TFT LCD.
Figure 2:
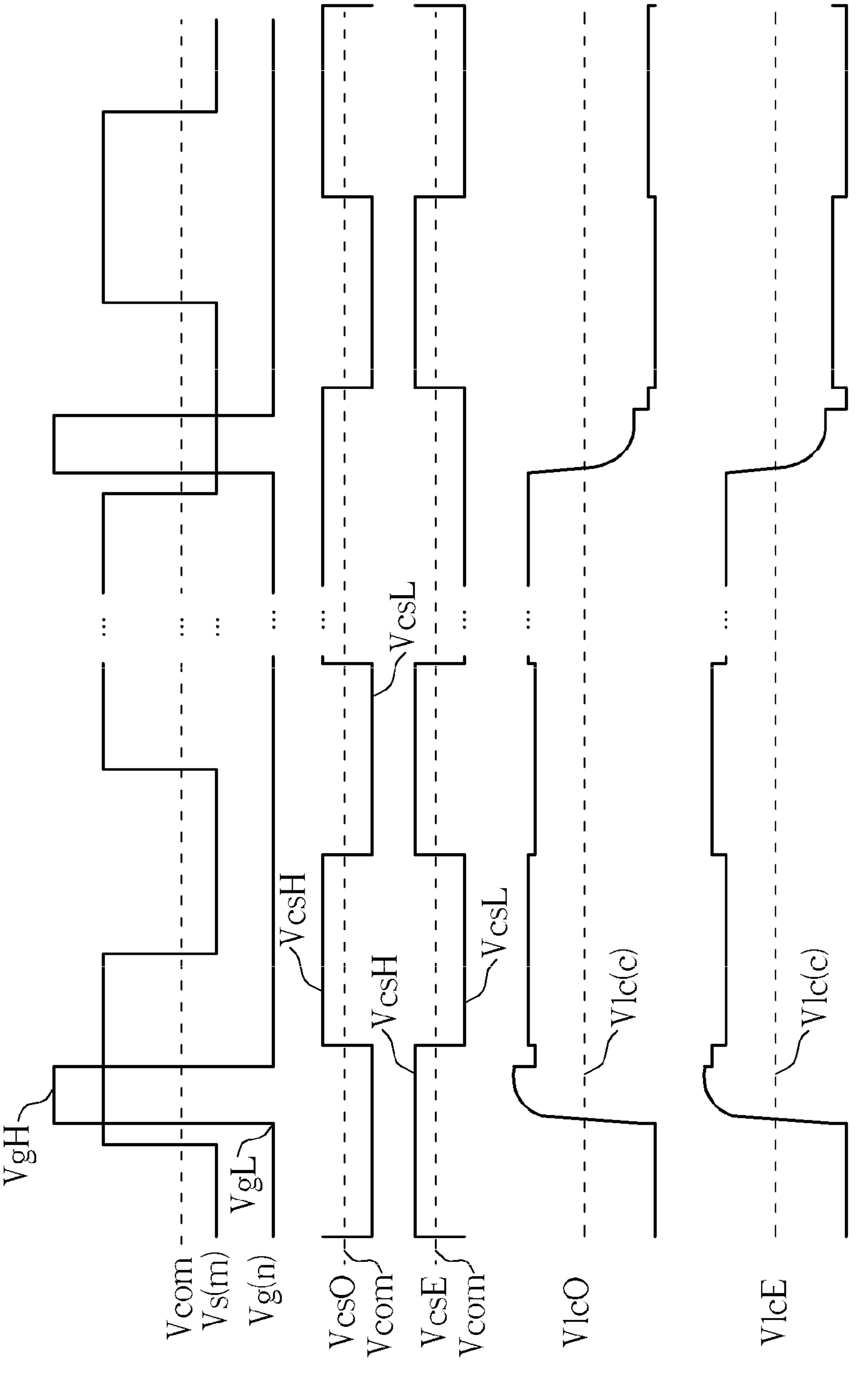
FIG. 2 PRIOR ART
FIG. 2 is a waveform diagram illustrating voltage level of control signals of the pixel shown in FIG. 1.
Figure 3:
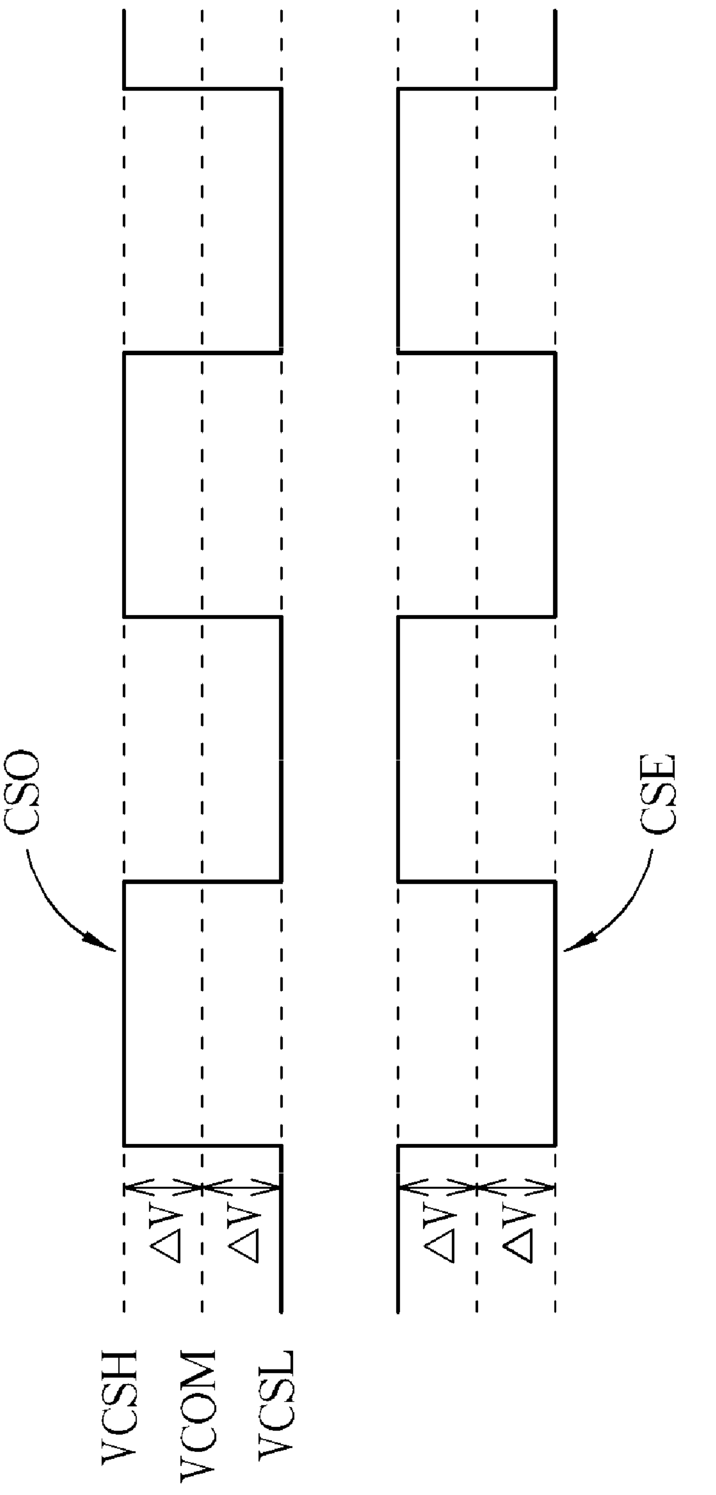
FIG. 3 is a waveform diagram illustrating common signals of an LCD.

Please refer to FIG. 3. FIG. 3 is a waveform diagram illustrating common signals of an LCD. In the embodiment of the present invention, the common signals are swing signals comprising a first common signal CSO and a second common signal CSE. The first common signal CSO and the second common signal CSE are complementary. The high-level voltage VCSH and the low-level voltage VCSL are symmetrical to each other and the voltage level of the common voltage VCOM is in the middle of the high-level voltage VCSH and the low-level voltage VCSL. Furthermore, the voltage difference between the high-level voltage VCSH and the common voltage VCOM is ΔV, and the voltage difference between the common voltage VCOM and the low-level voltage VCSL is ΔV as well. Therefore, the high-level voltage VCSH and the low-level voltage VCSL can be represented as the following formulas:

$$VCSH=VCOM+\Delta V \quad (1);$$

$$VCSL=VCOM-\Delta V \quad (2);$$

the common electrode end of the first storage capacitor of the pixel receives the first common signal CSO and the common electrode end of the second storage capacitor of the pixel receives the second common signal CSE. Hence, the high-level voltage VCSH and the low-level voltage VCSL of the common signals are required to be varied with the common voltage VCOM for avoiding the flicker of the LCD caused by the voltage asymmetry of the storage capacitors during the inversion of the liquid crystal.

Figure 4:
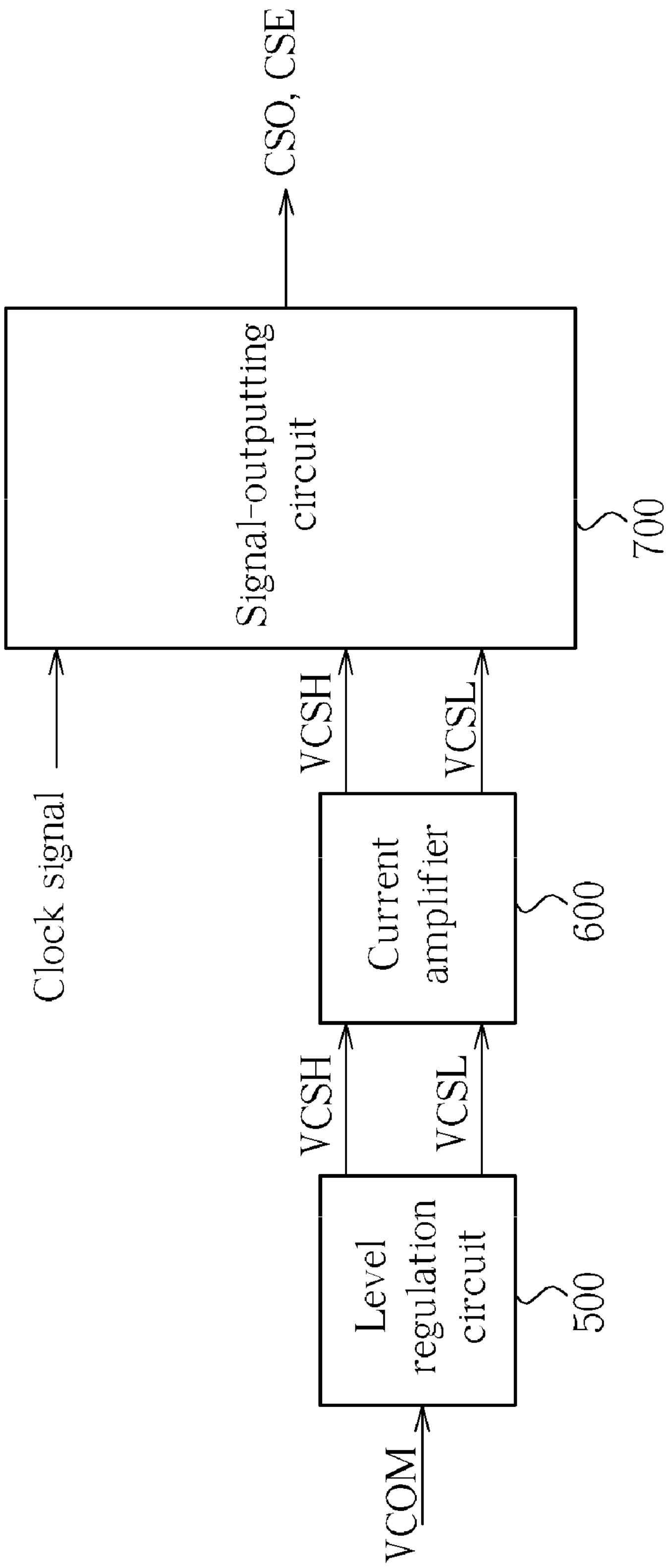
FIG. 4 is a block diagram illustrating a generating circuit of the common signals.

Please refer to FIG. 4. FIG. 4 is a block diagram illustrating a generating circuit of the common signals. The generating circuit of the common signals comprises a level regulation circuit 500, a current amplifier 600, and a signal-outputting circuit 700. The level regulation circuit 500 generates the high-level voltage VCSH and the low-level voltage VCSL of the common signals according to the common voltage. The current amplifier 600 increases the driving ability of the high-level voltage VCSH and the low-level voltage VCSL of the common signals. The signal-outputting circuit 700 is utilized for pulling the voltage level of the clock signal up between the high-level voltage VCSH and the low-level voltage VCSL of the common signals. Thus, the signal-outputting circuit 700 can generate the first common signal CSO and the second common signal CSE according to the high-level voltage VCSH and the low-level voltage VCSL of the common signals.

Figure 5:
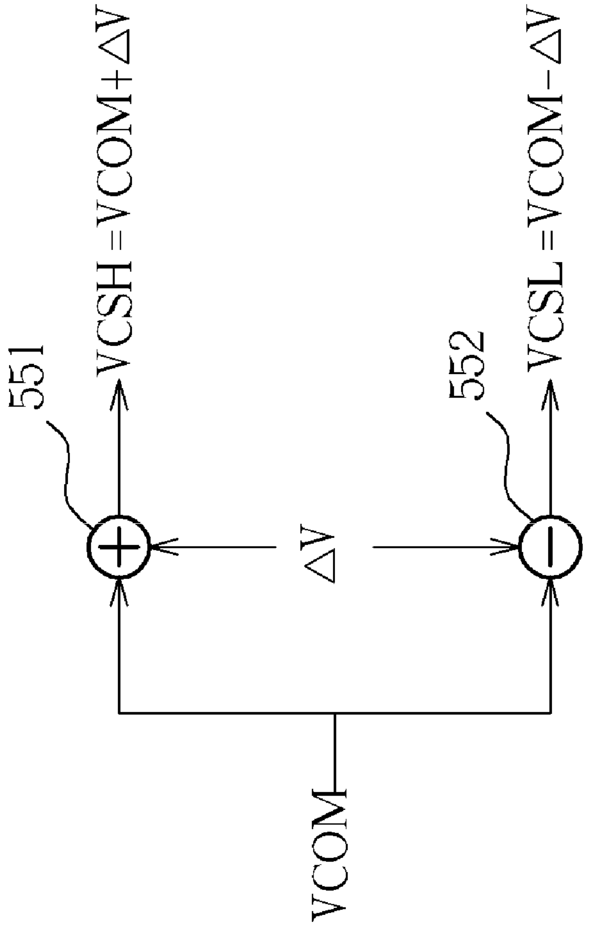
FIG. 5 is a diagram illustrating a level regulation circuit of the common signals.

Please refer to FIG. 5. FIG. 5 is a diagram illustrating a level regulation circuit of the common signals. The level regulation circuit of the common signals can be embodied by means of an adder 551 and a subtractor 552 generating the high-level voltage VCSH and the low-level voltage VCSL of the common signals according to the formulas (1) and (2). The high-level voltage VCSH can be generated by the adder 551 adding the common voltage VCOM and the voltage difference, and the low-level voltage VCSL can be generated by the subtractor 552 subtracting the voltage difference from the common voltage VCOM. Generally speaking, the adder 551 and the subtrator 552 require an operational amplifier, respectively. However, in the present invention, the high-level voltage VCSH and the low-level voltage VCSL of the common signals can be generated by means of only one operational amplifier.

Figure 6:
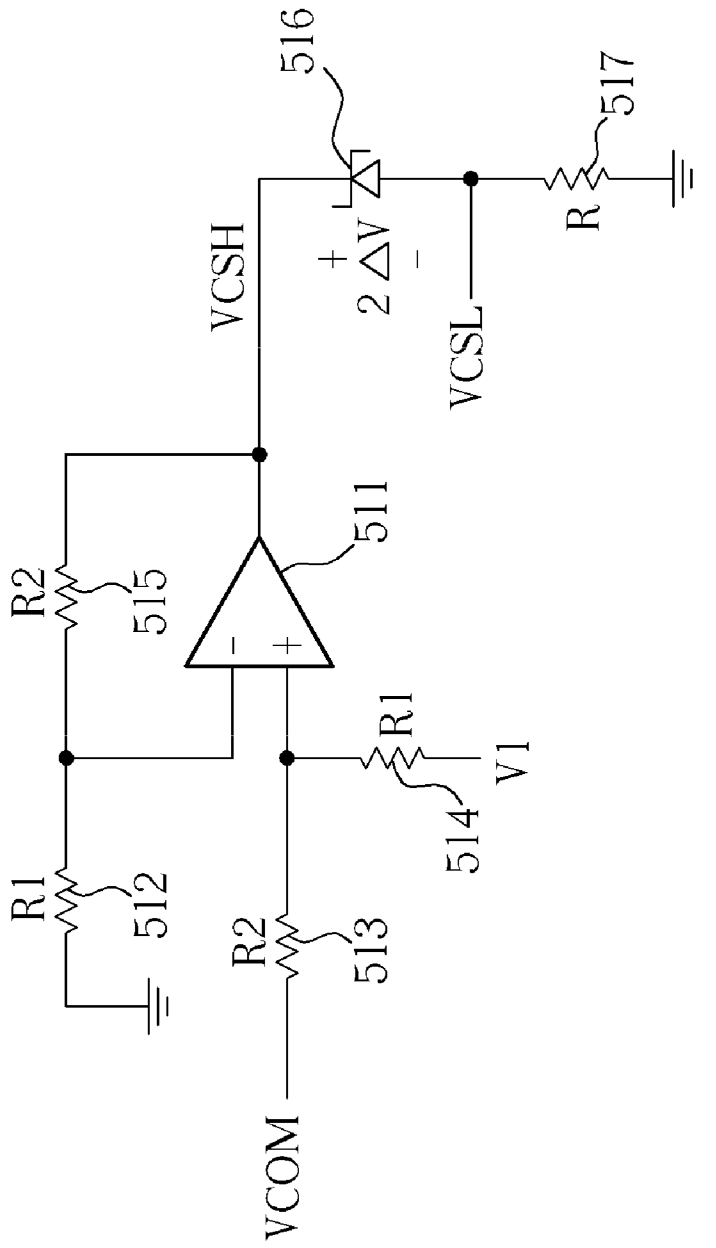
FIG. 6 is a circuit diagram illustrating a level regulation circuit of the common signals according to the first embodiment of the present invention.

Please refer to FIG. 6. FIG. 6 is a circuit diagram illustrating the first embodiment of a level regulation circuit of the common signals according to the present invention. The level regulation circuit comprises an operational amplifier 511, five resistors 512, 513, 514, 515, and 517, and a Zener diode 516. Both of the resistances of the resistors 512 and 514 are R1. Both of the resistances of the resistors 513 and 515 are R2. The resistance of the resistor 517 is R. The breakdown voltage of the Zener diode 516 is 2ΔV. The resistor 512 is electrically connected between a negative input end of the operational amplifier 511 and a ground end. The resistor 513 is electrically connected between a positive input end of the operational amplifier 511 and the common voltage source VCOM (providing the reference voltage VCOM). The resistor 514 is electrically connected between the positive input end of the operation amplifier 511 and a reference voltage source V1 (providing the reference voltage V1). The resistor 515 is electrically connected between the negative input end of the operation amplifier 511 and an output end of the operation amplifier 511. The Zener diode 516 is electrically connected to the output end of the operational amplifier 511. The resistor 517 is electrically connected between the Zener diode 516 and the ground end. In the level regulation circuit, the high-level voltage VCSH of the common signals can be generated from the output end of the operational amplifier 511. The relationship between the common voltage VCOM and the high-level voltage VCSH can be represented as the following formula:

$$VCSH=VCOM+V1\times(R2/R1) \quad (3);$$

according to formula (3), V1×(R2/R1) can be equal to ΔV by means of adjusting the resistance R1 and R2. In this way, the high-level voltage VCSH can be equal to (VCOM+ΔV). Since the Zener diode 516 is operated at the breakdown voltage 2 ΔV. The low-level voltage VCSL is generated by means of high-level voltage VCSH passing by the Zener diode 516 (VCSL=VCSH−2ΔV). Thus, the level regulation circuit of the present invention can generate the high-level voltage VCSH and the low-level voltage VCSL of the common signals by means of only one operational amplifier.

Figure 7:
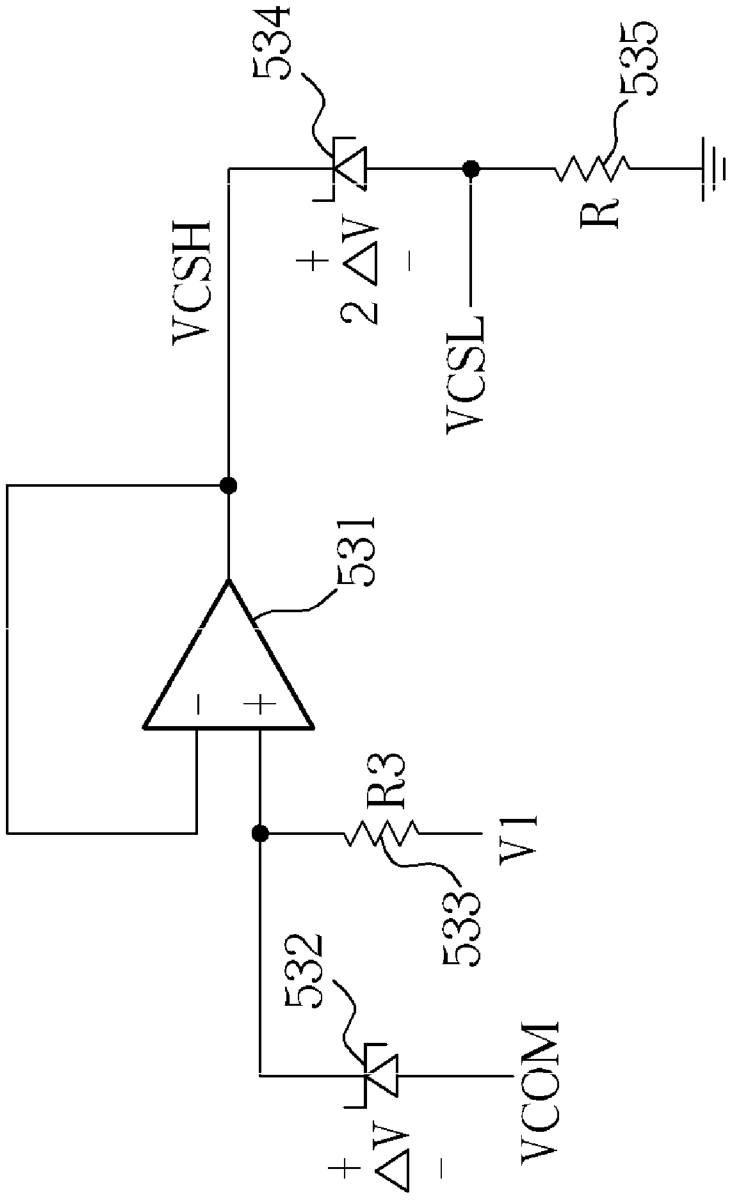
FIG. 7 is a circuit diagram illustrating a level regulation circuit of the common signals according to the second embodiment of the present invention.

Please refer to FIG. 7. FIG. 7 is a circuit diagram illustrating the second embodiment of a level regulation circuit of the common signals according to the present invention. In the first embodiment shown in FIG. 6, since the high-level voltage VCSH is varied with the reference voltage V1, the resistances of the resistors R1 and R2 have to be adjusted according to the voltage level of the reference voltage V1 for keeping high-level voltage VCSH equal to (VCOM+ΔV). In the second embodiment, the level regulation circuit can stably generate the high-level voltage VCSH equal to (VCOM+ΔV). In the second embodiment, the level regulation circuit comprises an operational amplifier 531, two resistors 533 and 535, and two Zener diodes 532 and 534. The resistance of the resistor 533 is R3. The resistance of the resistor 535 is R. The breakdown voltage of the Zener diode 532 is ΔV. The breakdown voltage of the Zener diode 534 is 2ΔV. The resistor 533 is electrically connected between a positive input end of the operational amplifier 531 and the reference voltage source V1. The Zener diode 532 is electrically connected between the positive input end of the operational amplifier 531 and the common voltage source VCOM. A negative input end of the operational amplifier 531 is electrically connected to an output end of the operational amplifier 531. The Zener diode 534 is electrically connected to the output end of the operational amplifier 531. The resistor 535 is electrically connected between the Zener diode 534 and the ground end. The voltage level of the reference voltage V1 must be higher than VCOM. In this way, even if the common voltage VCOM is varied, the Zener diode 532 still can be operated at the breakdown voltage ΔV. In the level regulation circuit, the high-level voltage VCSH of the common signals can be generated from the output end of the operational amplifier 531. The relationship between the common voltage VCOM and the high-level voltage VCSH can be represented as the following formula:

$$VCSH=VCOM+\Delta V \quad (4);$$

the low-level voltage VCSL is generated to be equal to (VCOM-ΔV) by means of the high-level voltage VCSH passing by the Zener diode 534. In the present embodiment, the operational amplifier 531 forms a voltage follower. As a result, as long as the voltage on the positive input end of the operational amplifier 531 is equal to (VCOM+ΔV), the voltage on the output end of the operational amplifier 531 is equal to (VCOM+ΔV).

Figure 8:
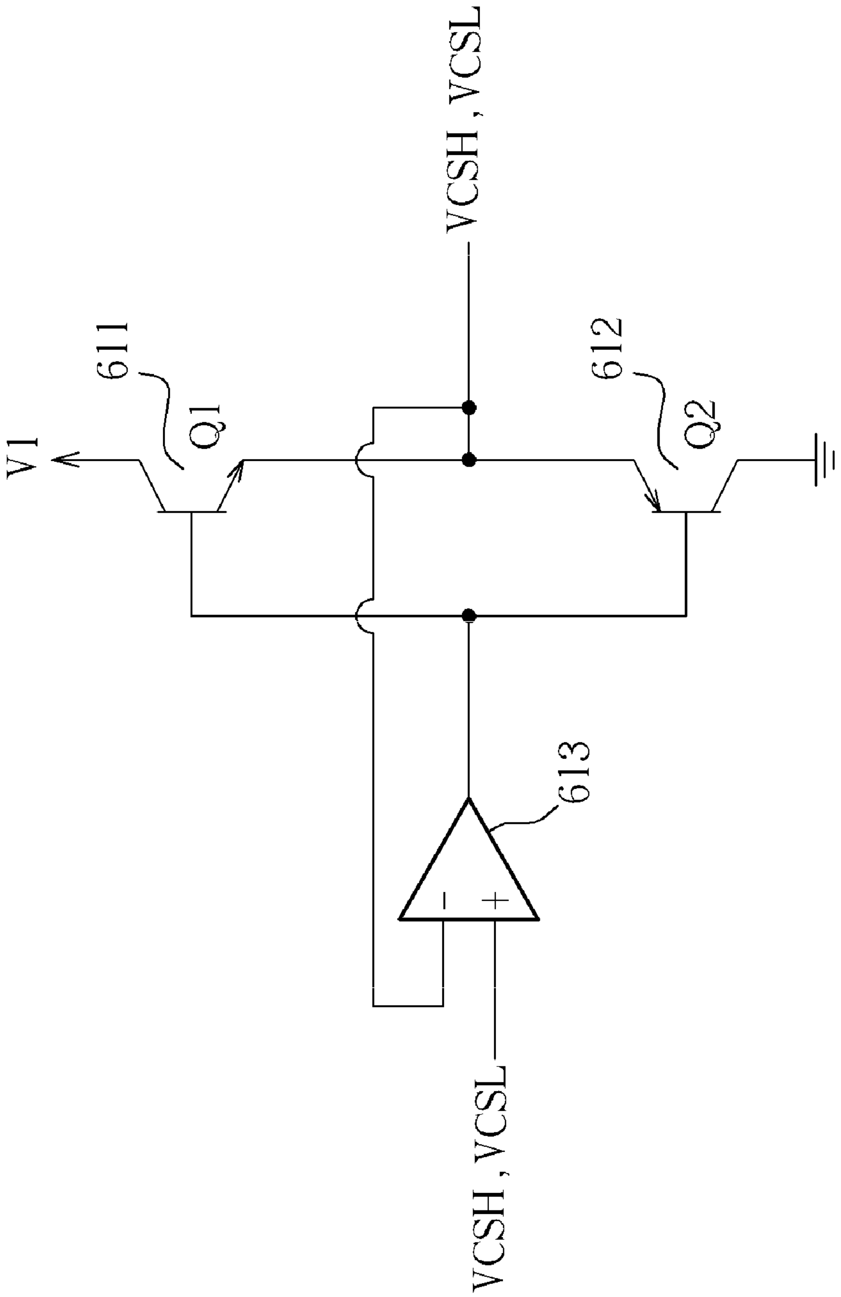
FIG. 8 is a circuit diagram illustrating a current amplifier.

Please refer to FIG. 8. FIG. 8 is a circuit diagram illustrating a current amplifier. The current amplifier comprises an NPN transistor 611, a PNP transistor 612, and an operational amplifier 613. The NPN transistor 611 is electrically connected to the reference voltage source V1. The PNP transistor 612 is electrically connected to the ground end. The NPN transistor 611 and the PNP transistor 612 form an inverter. An output end of the operational amplifier 613 is electrically connected to an input end of the inverter. A negative input end of the operational amplifier 613 is electrically connected to an output end of the inverter. The high-level voltage VCSH and the low-level voltage VCSL generated by the level regulation circuit is inputted to a positive input end of the operational amplifier 613. The current amplifier can increase the driving ability of the high-level voltage VCSH and the low-level voltage VCSL.

Figure 9:
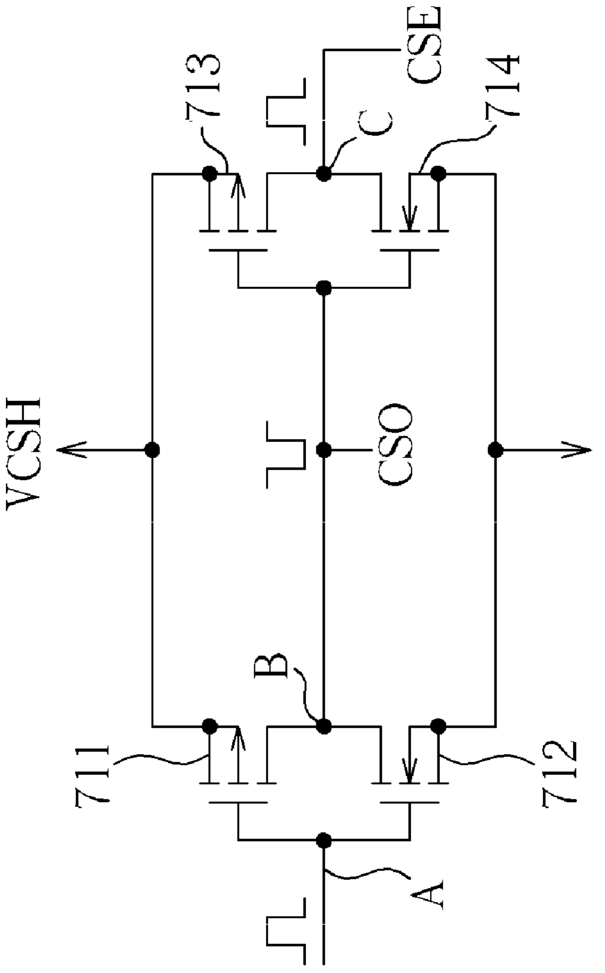
FIG. 9 is a circuit diagram illustrating a signal-generating circuit.

Please refer to FIG. 9. FIG. 9 is a circuit diagram illustrating a signal-outputting circuit. The signal-generating circuit comprises two PMOS transistor 711 and 713, and two NMOS transistor 712 and 714. The PMOS transistors 711 and 713 are electrically connected to the high-level voltage VCSH of the common signals. The NMOS transistors 712 and 714 are electrically connected to the low-level voltage of the common signals. The PMOS transistor 711 and the NMOS transistor 712 form a first inverter. The PMOS transistor 713 and the NMOS transistor 714 form a second inverter. When a clock signal is inputted to the node A, the voltage level of the clock signal can be pulled up between the high-level voltage VCSH and the low-level voltage VCSL. Hence, the first common signal CSO is outputted from the node B, and the second common signal CSE is outputted from the node C.

In conclusion, the present invention provides a level regulation circuit of a common signal of an LCD generates a first level voltage and a second level voltage according to a common voltage so as to generate a first common signal and a second common signal. Each pixel of the LCD includes two storage capacitors receiving the first common signal and the second common signal respectively. The level regulation circuit of the common signal uses an operational amplifier and one or two Zener diodes to generate the first level voltage and the second level voltage. The first level voltage and the second level voltage have the same voltage difference to the common voltage, so the flicker of the LCD can be reduced.

Those skilled in the art will readily observe that numerous modifications and alterations of the device and method may be made while retaining the teachings of the invention.

What is claimed is:

1. A level regulation circuit of a common signal of a Liquid Crystal Display (LCD), comprising:

an operational amplifier, comprising a positive input end, a negative input end, and an output end;

a first resistor, comprising a first end electrically connected to the negative input end of the operational amplifier, and a second end electrically connected to a ground end;

a second resistor, comprising a first end electrically connected to the positive input end of the operational amplifier, and a second end for receiving a common voltage;

a third resistor, comprising a first end electrically connected to the positive input end of the operational amplifier, and a second end for receiving a reference voltage;

a fourth resistor, comprising a first end electrically connected to the negative input end of the operational amplifier, and a second end electrically connected to the output end of the operational amplifier; and a Zener diode, comprising a first end electrically connected to the output end of the operational amplifier for outputting a first level voltage of the common signal, and a second end electrically connected to the ground end through an output resistor for outputting a second level voltage of the common signal.

2. The level regulation circuit of claim 1, wherein the Zener diode has a breakdown voltage.

3. The level regulation circuit of claim 2, wherein the first resistor and the third resistor have a first resistance, respectively, and the second resistor and the fourth resistor have a second resistance, respectively.

4. The level regulation circuit of claim 3, wherein the first resistance and the second resistance are utilized for generating a coefficient, and the product of the coefficient and the reference voltage is equal to a half of the breakdown voltage.

5. The level regulation circuit of claim 2, wherein voltage level of the first level voltage of the common signal is equal to the common voltage adding a half of the breakdown voltage, and voltage level of the second level voltage of the common signal is equal to the common voltage subtracting a half of the breakdown voltage.

6. A level regulation circuit of a common signal of an LCD, comprising:

an operational amplifier, comprising a positive input end, a negative input end, and an output end electrically connected to the negative input end of the operational amplifier;

a resistor, comprising a first end electrically connected to the positive input end of the operational amplifier, and a second end for receiving a reference voltage;

a first Zener diode, comprising a first end electrically connected to the positive input end of the operational amplifier, and a second end for receiving a common voltage; and a second Zener diode, comprising a first end electrically connected to the output end of the operational amplifier for outputting a first level voltage of the common signal, and a second end electrically connected to a ground end for outputting a second level voltage of the common signal.

7. The level regulation circuit of claim 6, wherein the reference voltage is higher than the common voltage.

8. The level regulation circuit of claim 6, wherein a breakdown voltage of the second Zener diode is twice as high as a breakdown voltage of the first Zener diode.

9. The level regulation circuit of claim 8, wherein the first level voltage of the common signal is equal to the common voltage adding the breakdown voltage of the first Zener diode, and the second level voltage of the common signal is equal to the common voltage subtracting the breakdown voltage of the first Zener diode.

10. The level regulation circuit of claim 6, wherein the operational amplifier forms a voltage follower, and a voltage level of the positive input end of the operational amplifier is equal to a voltage level of the output end of the operational amplifier.

* * * * *